Feb. 19, 1924.

O. D. TAUERN ET AL 1,484,584

FINDER FOR MOTION PICTURE CAMERAS AND SIMILAR OPTICAL APPLIANCES

Filed Aug. 1, 1922

Inventors
Odo D. Tauern and
Nikolaus Lyon
by P. Singer Atty

Patented Feb. 19, 1924.

1,484,584

UNITED STATES PATENT OFFICE.

ODO D. TAUERN AND NIKOLAUS LYON, OF FREIBURG, GERMANY.

FINDER FOR MOTION-PICTURE CAMERAS AND SIMILAR OPTICAL APPLIANCES.

Application filed August 1, 1922. Serial No. 579,075.

*To all whom it may concern:*

Be it known that we, ODO D. TAUERN and NIKOLAUS LYON, citizens of Germany, residents of Eggstrasse #5, Freiburg, Germany, have invented a useful Improvement in a Finder for Motion-Picture Cameras and Similar Optical Appliances, of which the following is a full, clear, and exact specification, reference being had therein to the accompanying drawing.

In cinematographs the practice of observing the picture by means of a screen picture is known, the latter being produced by a partial reflection of the rays by a glass plate inserted diagonally in the ray path of the objective. This device which is very desirable for the purpose of continually supervising the picture as to its sharpness and contents, is for this reason hardly practical for motion picture cameras, as the picture produced on the finder screen is altogether too weak.

The invention consists in that the finder picture is not obtained on a screen, but by inserting directly behind the picture windows in the path of the finder rays a system of lenses which as a positive optical link produces a real picture of the object to be taken and which can be examined with a magnifying glass or similar optical appliance, and despite the very small ray portion which is taken from the main picture, is exceedingly rapid. Furthermore, the false light falling through the ocular into the finder below is dispersed and weakened by the system of lenses, so that no effects of this false light are seen in the film. The drawing shows one application of a motion picture camera in simplified form, to wit; in horizontal longitudinal sections, whereby—

Figure 1:
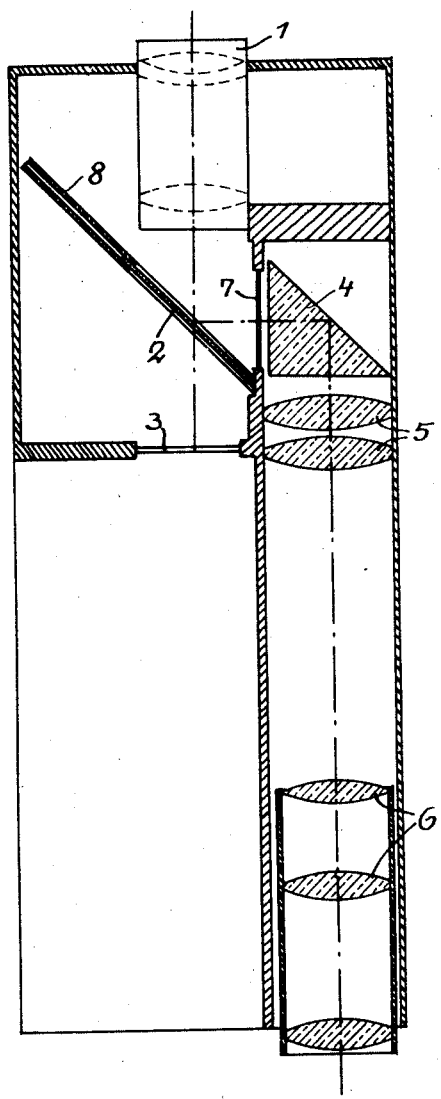
Figure 1 is a sectional view of a camera embodying one form of our invention.

Behind the objective tube 1 of the camera according to Figure 1 a thin plane glass plate 2 is inserted at an angle of 45° in such manner that it catches part of the picture rays in front of the film window 3, reflecting them laterally. A completely reflecting prism 4 is arranged laterally in the direction of the reflected rays in such manner that it turns aside these rays a second time, giving them a direction parallel to the objective axis.

The rays deflected by the prism 4 fall through the system of lenses 5 into a finder 6 of the description of a magnifying glass. A diaphragm 7 arranged between the diagonal plate 2 and the prism 4 limits the tentative picture in size and shape in the same way as the principal picture is limited in the film window 3.

The glass 2 is arranged to slide in a guide 8 in such manner that it can be taken out of the ray path of the objective 1, when not necessary for producing a finder picture.

Figure 2:
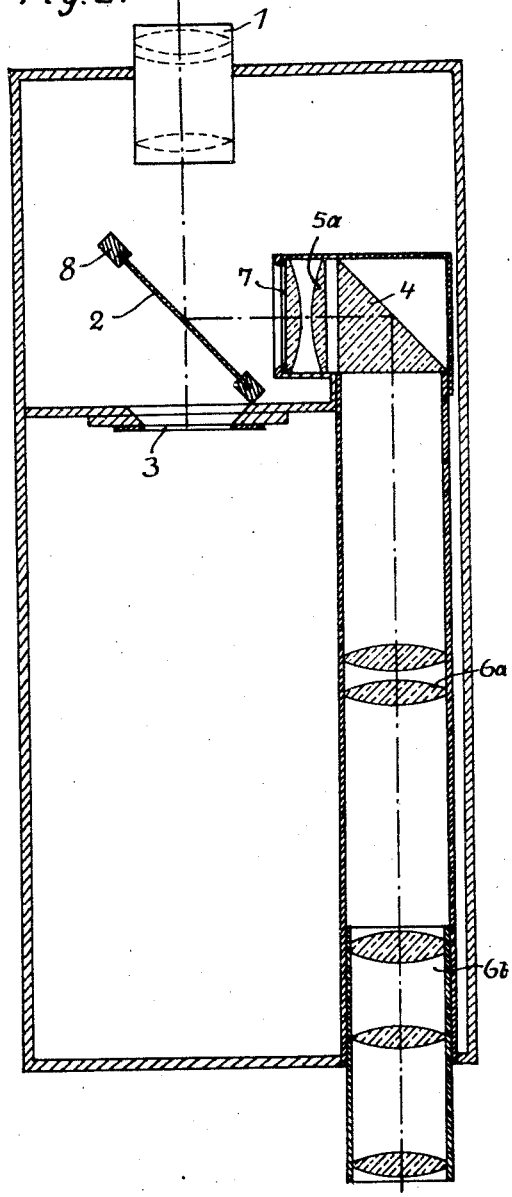
Figure 2 is a similar view showing a modified form of the invention.

In the second application according to Fig. 2 the parts 1, 2, 3 and 4 remain unchanged as above described. In place of the lens system 5 a regular condenser lens system $5^a$ is provided which is in front of the refracting prism 4 and immediately behind the finder window 7. In addition the finder is sub-divided into an objective $6^a$ and an ocular $6^b$ the latter of which may be shifted longitudinally.

The condenser system $5^a$ receives the entire picture limited by the finder window 7, and breaks the diverging rays in such manner that the entire picture falls into the finder objective $6^a$ which, in turn, produces a real picture which may be examined through ocular $6^b$.

Having now fully described and ascertained the nature of our invention and in what manner the same is to be performed, we declare that what we claim is:

In a motion picture camera, an objective, a plane glass plate placed diagonally behind the objective to cause part of the light to pass therethrough and deflect the remaining lesser part of the light rays laterally, a film window behind said glass plate and in line with the objective, a lens system in the path of the deflected rays behind the picture plane, a finder in which a real picture of the object to be taken is produced by said lens system and a screen corresponding to the size of the picture and arranged between said glass plate and said lens system and in the path of the deflected rays.

In witness whereof we affix our signatures.

DR. ODO D. TAUERN.
DR. NIKOLAUS LYON.